FIG. 2

INVENTOR.
MYRON H. WILLITS

VALVES 14, 27, 28, 29 & 30 operate as a function of the PRESSURE within casing area 33.
VALVES 94a & 94b operate as a function of the DISPLACEMENT of barrel 26.
VALVES 31 & 32 operate as a function of the PRESSURE DIFFERENTIAL between barrel 26 and tubing 20.

$r$ = normal rate at which pressure increases in the sealed system due to pump 10.
$r-30$ = rate of pressure increase with valve 30 open to production tubing 20.
$r-28$ = rate of pressure increase with valve 28 open to production tubing 20.

INVENTOR.
MYRON H. WILLITS

FIG. 4

Oct. 27, 1964  M. H. WILLITS  3,154,018
FLUID LIFT SYSTEM

Filed April 2, 1962  7 Sheets-Sheet 5

INVENTOR.
MYRON H. WILLITS

BY
his ATTORNEYS

INVENTOR.
MYRON H. WILLITS
BY
his ATTORNEYS

Oct. 27, 1964    M. H. WILLITS    3,154,018
FLUID LIFT SYSTEM

Filed April 2, 1962    7 Sheets-Sheet 7

INVENTOR.
MYRON H. WILLITS
BY
his ATTORNEYS

United States Patent Office 3,154,018
Patented Oct. 27, 1964

3,154,018
FLUID LIFT SYSTEM
Myron H. Willits, 1331 New York St., New Orleans, La., assignor of one and one-fourth percent to Leonard Glade and sixteen and one-fourth percent to Cicero C. Sessions, both of New Orleans, La.
Filed Apr. 2, 1962, Ser. No. 184,245
21 Claims. (Cl. 103—46)

This invention relates to systems for obtaining fluids from distant or relatively inaccesible locations and, more particularly, to a system that moves fluids through a closed conduit by the proper application of hydrostatic pressures.

This application is a continuation-in-part of my copending application Serial No. 29,902, filed on May 18, 1960 for a "Fluid Lift System" now abandoned.

There has long been a need for an apparatus that can draw large quantities of a fluid from inaccessible locations in an economical manner. This is especially true, for example, in the oil industry where oil must be pumped from the wells after the natural pressures are no longer sufficient to lift it to the surface.

Present day pumping mechanisms for this purpose have several disadvantages, among them being those of depth and volume limitations. Usually the pumps are actuated by long sucker rods which extend to the surface of the earth. In another type of system, a downhole pump is actuated by the flow of fluid that is pumped through it. Besides the fact that these installations are very expensive, they are difficult to maintain and they cannot pump sizable quantities of fluid from great depths.

Accordingly, it is a purpose of the present invention to provide a system for obtaining fluids such as oil from relatively inaccessible locations which does not have the above-described disadvantages. In a preferred embodiment of the invention, this system includes a fluid pressure operated pump adapted to be disposed in a borehole traversing subterranean formations for obtaining well effluent. This pump is connected by a column of power transmission fluid to a system at substantially the surface of the earth for applying a variable pressure to the column.

The fluid pressure operated pump includes a traveling container, means for guiding the movement of the container, and a plurality of pressure operated valves which are adapted to permit the power transmission fluid to exert pressure first on one side of the traveling container when the pressure on the power transmission fluid is at a first magnitude, and then on its opposite side when the pressure on the power transmission fluid is increased to a second magnitude. By periodically changing the pressure on the column of power transmission fluid, the traveling container is made to move back and forth. Further valves are provided which operate such that the container is periodically filled and emptied of the oil, which is pumped out of the well by the movement of the container.

It can be seen that this system has considerable advantages because power is transmitted from the surface of the earth to the pump in the well through a column of fluid on which pressure is periodically increased and decreased. This is advantageous because mechanical linkages are not needed, only one conduit is required in addition to the well casing, and large quantities of the power transmission fluid are not mixed with the fluid being pumped.

This invention can be more completely understood from the following detailed description taken in conjunction with the accompanying figures of the drawings in which.

Figure 1:
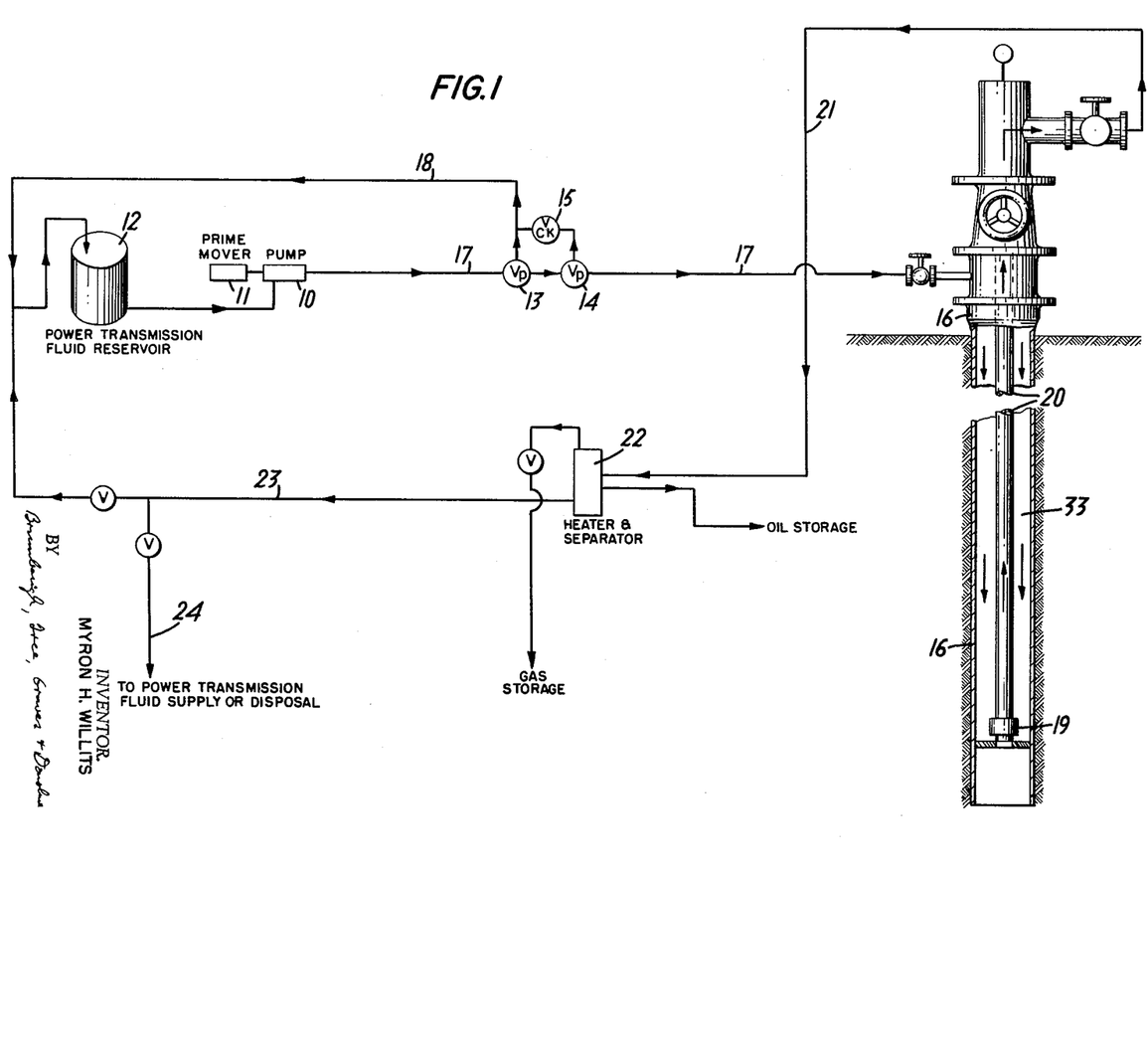
FIG. 1 is a schematic diagram of a fluid lift system constructed in accordance with the invention.

The system illustrated in FIG. 1 includes a pump 10 at the earth's surface which is driven by a prime mover 11 and pumps a power transmission fluid out of a reservoir 12 into a conduit 17. This fluid is forced under pressure through three valves 13, 14 and 15, comprising a valve manifold, by the pump 10 to a well casing 16. The valves 13 and 14 are conventional three-way valves, the valve 14 being adapted to open and allow fluid flow from the pump 10 to the well casing 16 at a first pressure in the conduit 17 and to prevent such fluid flow at a second pressure. When the valve 14 is operated to prevent flow from the pump 10 to the casing 16, it provides a pressure relief path from the conduit 17 to the conduit 18 through the valve 15, which is a one way check valve. The valve 13 is preferably coupled to the valve 14 in such a manner that it passes fluid to the casing 16 only when the valve 14 is open and directs the fluid to a bypass line 18 when the valve 14 is closed. The valve 15, for example, a check valve, allows fluid to flow only toward the bypass line 18, which returns the power transmission fluid to the reservoir 12 when the valves 13 and 14 are closed.

A pump 19, to be described in detail hereinafter, is disposed within the well casing 16 and forces oil upwardly through a production tubing 20 and a flow line 21. This line may be connected, if required, to a heater and separator unit 22 which separates the oil from the small quantity of power transmission fluid that is forced into the production tubing 20 and from the natural gas accompanying the oil. The gas and oil are taken out of the unit 22 by suitable means and carried to conventional storage containers (not shown). The quantity of power transmission fluid is taken from the unit 22 by a return line 23 which returns it to the reservoir 12. In the event some of the power transmission fluid is lost, it may be replaced by a conduit 24 running to a supply pit, or, in the case of excess fluid, the conduit 24 may be used to lead the fluid to a disposal pit.

Figure 2:
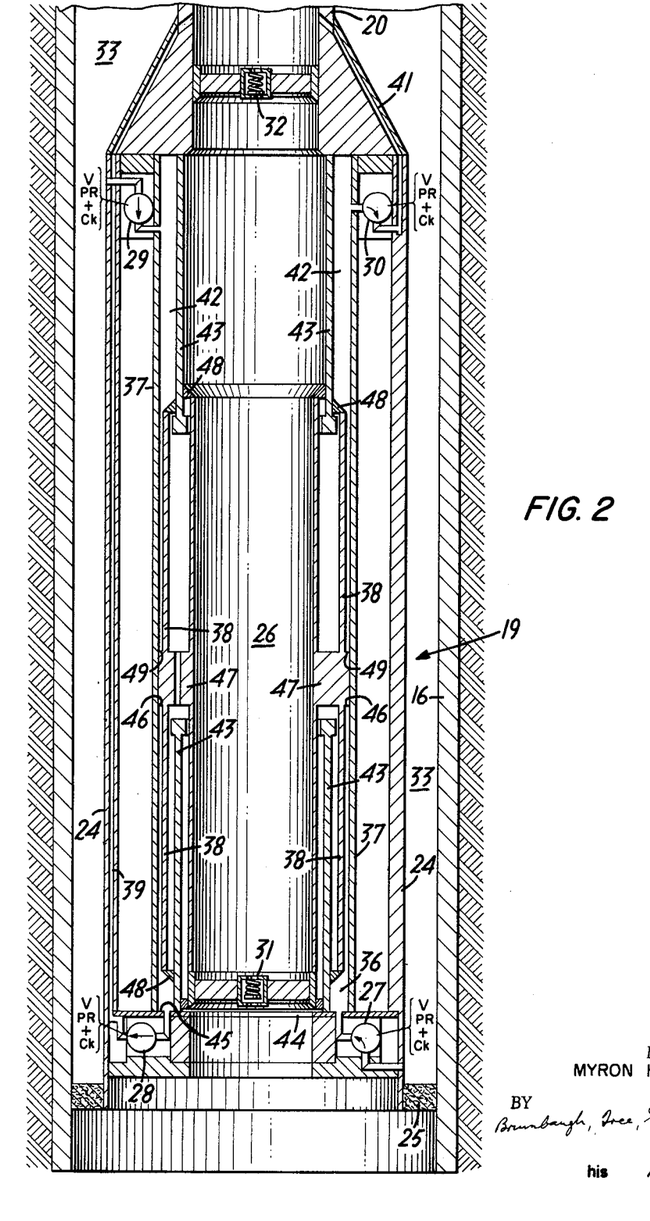
FIG. 2 is a general schematic representation in longitudinal cross-section of an exemplary embodiment of a pump for the system with its traveling barrel in a first position, in accordance with the invention.
Figure 3:
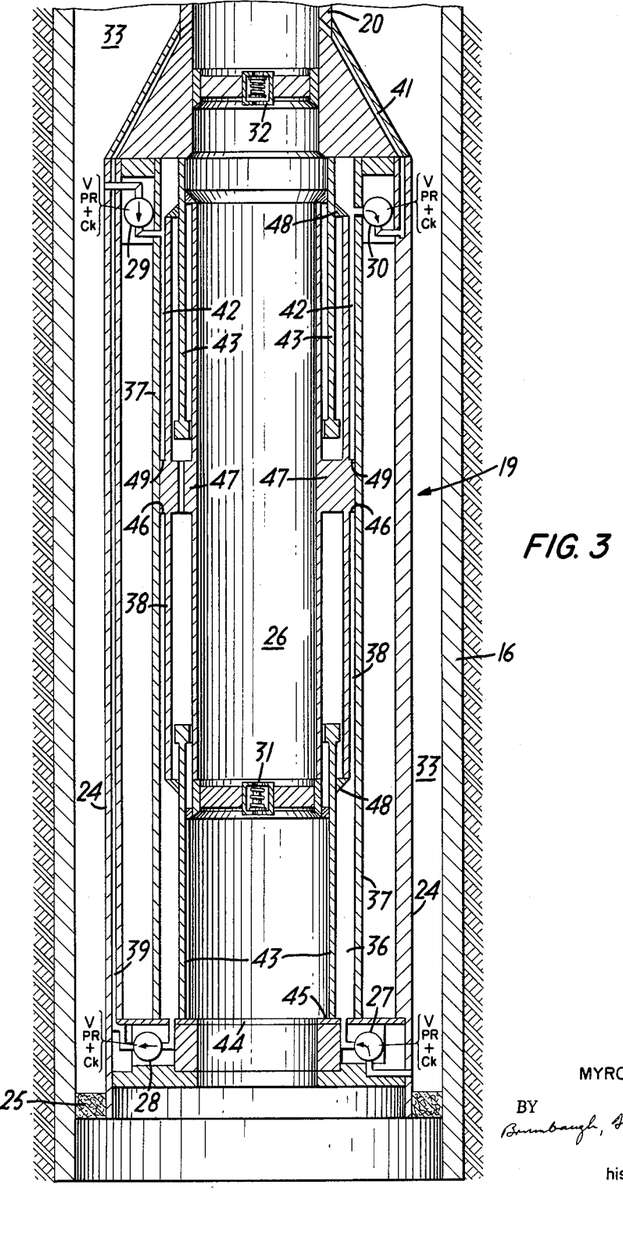
FIG. 3 is a schematic representation of the pump of FIG. 2 with its traveling barrel in a second position.

The pump 19 in the well casing 16 is shown in detail in FIGS. 2 and 3. In FIG. 2 the pump is at the beginning of a cycle and in FIG. 3 it is at approximately the half-way point in its cycle. This pump is actuated by the pressure exerted on it due to the power transmission fluid contained in area 33 between the well casing 16 and the outer wall of the pump 19, which is equal to the force on the column applied by the pump 10 at the surface of the ground and the weight of this column of fluid.

The pump 19 includes an outer mandrel 24 which is fastened to the lower end of the tubing 20. A conventional production packer 25 is used to completely seal off the section of the well casing 16 below the pump from the section above the pump. The pump 19 also includes a traveling container or barrel 26 that moves between the down position shown in FIG. 2 and the up position shown in FIG. 3. Four pressure sensitive valves 27–30 control the application of the pressure on the barrel 26, and consequently its movement, and two check valves 31 and 32 control the flow of oil into and out of the barrel.

Figure 4:
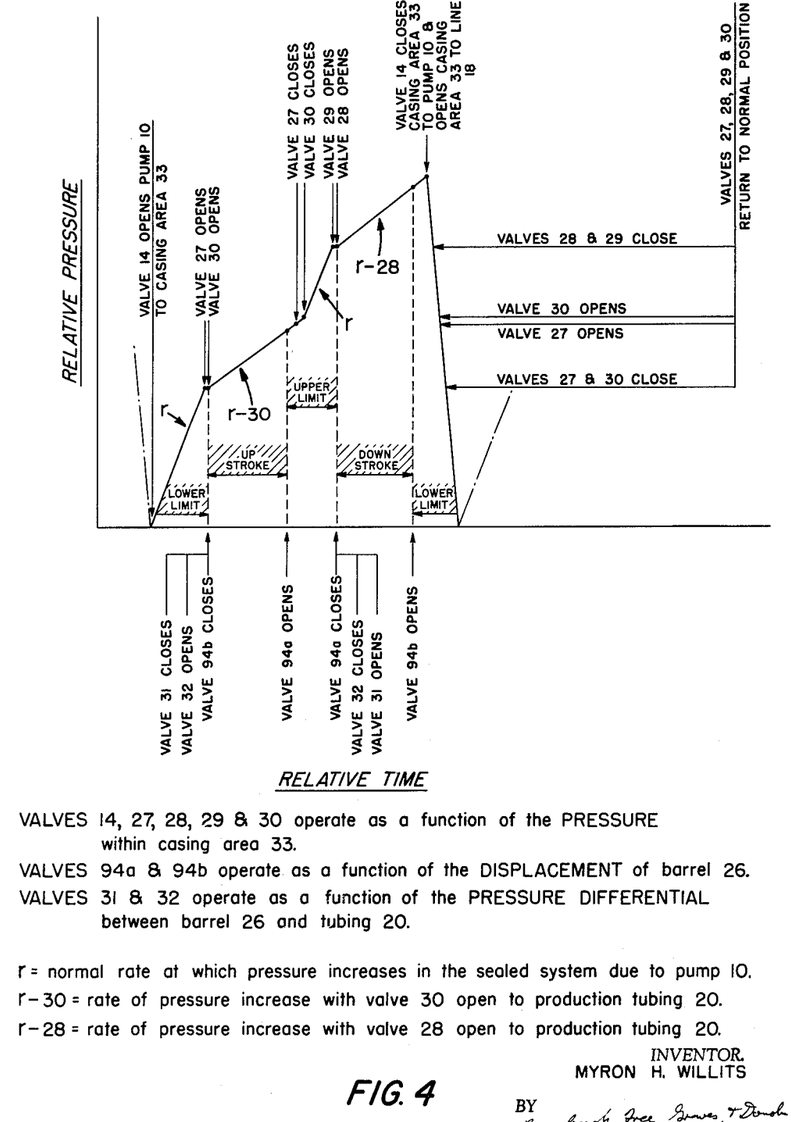
FIG. 4 is a graphical representation of a profile of the pressure exerted on the power transmission fluid during one cycle of operation of the system in response to one specific and exemplary valve sequence which incorporates optional breaking valves.

The pressure applied on the column of fluid by pump 10 causes the pressure on pump 19 in the well to vary in accordance with the profile illustrated in FIG. 4 and the four valves 27–30 to operate according to the schedule indicated. (It is to be noted that this profile and graph represent only one valve sequence for one particular embodiment. The embodiment shown has incorporated braking valves which will be discussed later and which are not incorporated in the embodiment shown in FIGS. 2 and 3).

The valve 27 is a dual pressure operated type that is set to open at a first pressure and to close at a second higher pressure. When the pressure applied on the column by pump 10 at the surface of the ground is increased from some low value to the point where the valve 27 opens, the power transmission fluid passes from space 33, through valve 27 and into a chamber 36 between a wall 37 and the outer wall 38 of the traveling barrel 26 and lower wall 43 below lower member 48 as shown in FIGS. 2 and 3.

The valve 30 is also a dual pressure operated type. Its inlet port is connected to chamber 42 and its outlet port to production tubing 20 via channel 41. Valve 30 is set to open only when the pressure in chamber 42 reaches a predetermined value. Also this same valve closes when the pressure in chamber 42 reaches a specific higher value. Upper chamber 42 is similar to lower chamber 36 and is defined as the space within cylindrical wall 37 and external to cylindrical guide 43 and upper outer wall 38 of traveling barrel 26.

The valve 29 is a one-way pressure operated type that opens only when the pressure on the power transmission fluid within casing area 33 is above a specific predetermined value, as indicated in FIG. 4. When valve 29 is open, it allows the power transmission fluid within the casing area 33, to flow through it into chamber 42. Valve 29 differs from valves 27 and 30 in that it closes only when the pressure in area 33 falls below its opening pressure as shown in FIG. 4.

The valve 28 is similar to valve 29 except that its inlet port is connected to chamber 36 and its outlet port to production tubing 20 via channel 39 located within wall 24. Thus when the pressure within chamber 36 reaches a predetermined value, valve 28 opens and remains open until the pressure in chamber 36 falls below this same predetermined value.

These four valves 27–30 are used in conjunction with a check mechanism that permits fluid through them in one direction only.

At the beginning of a cycle, the traveling barrel 26 is at the lowermost point in its travel and the check valve 31 is open, which allows the formation fluid to flow through a suitable opening 44 of any desired configuration in a plate 45 at the bottom of the pump into the traveling barrel 26. The check valve 32 at the top of the pump is closed since the pressure exerted by the column of the well effluent within production tubing 20, which extends to the surface of the ground during operation, is greater than that within the traveling barrel 26. The four valves are initially closed because the pressure of the power transmission fluid at the pump 19 is less than the predetermined opening pressures of the valves.

When this pressure is increased to a predetermined level at an initial rate "r" due to the action of pump 10 on a closed system as shown in FIG. 4, the valve 27 opens and allows the power transmission fluid to flow into the chamber 36 within the pump. This fluid exerts an upwardly directed force on the undersurface 46 of a member 47 formed on the outer wall 38 of the traveling barrel 26. This upward force on barrel 26 correspondingly tries to compress the fluid within chamber 42. Due to the relatively slight compressibility of the fluid, the pressures in area 33 and chambers 36 and 42 are soon equal and rising at rate "r" due to the continued action of pump 10. When the pressure in chamber 42 reaches this initial predetermined level (or an optional higher level) valve 30 opens, allowing the power transmission fluid in chamber 42 to be exhausted through valve 30 into production tubing 20. Since the pressure within production tube 20 is much less than the pressure within area 33 and chamber 36, the fluid within chamber 42 will be freely exhausted and barrel 26 will rise to the position shown in FIG. 3. The rate of pressure increase is, of course, less than "r" due to the loss of fluid through valve 30 and is designated "r–30" in FIG. 4.

The valve 31 is located within the floor of traveling barrel 26. This valve closes as it starts its upward motion and thereby compresses the well effluent located within area 26. When the pressure within the barrel 26 exceeds that within the production tubing 20, valve 32 opens and allows the well effluent to be forced from barrel 26 into the production tubing 20 as the barrel proceeds upward to the position shown in FIG. 3.

Seals 48 are fastened to the inner and outer walls of the barrel 26 in sealing relation to the cylindrical guide member 43. Because of the frictional losses inherent in the system and the throttling effect as fluid escapes through valves 30 and 32, the pressure within area 33 and chamber 36 continues to increase as the traveling barrel 26 approaches the upper limit of its displacement cycle. Finally in the detailed embodiment shown in FIG. 8, braking elements, which are discussed in detail below, equalize the pressure within casing area 33 and chambers 42 and 36, thus removing the force acting on barrel 26 and allowing the friction within the system to stop the barrel's remaining inertia. During this period the closing pressure of valve 27 is also reached.

In a system without braking valves the pressure in casing area 33 would again increase at the rate "r" after the closing of valve 27. However, as shown in FIG. 4, in a system with braking valves, the pressure continues to icrease in casing area 33 at a rate "r–30." In a system with braking valves, this pressure increase is also experienced within chamber 42, thereby allowing valve 30 to close once its higher closing pressure is reached but before valve 29 opens.

As the pressure exerted on the column of power transmission fluid within area 33 is increased still further, due to the action of the pump at the surface of the ground, the opening pressure for valve 29 is reached. The power transmission fluid then enters chamber 42 through the valve 29 and exerts a downwardly directed force on the upper surface 49 of the member 47. In a system without braking valves, the pressure within chamber 42 remains at the closing pressure of valve 27 until valve 29 opens thereby keeping valve 30 open. When valve 29 opens a much higher pressure enters chamber 42 which forces valve 30 closed. Thus in a system without braking elements, valve 30 closes only after valve 29 opens even though the pressure in casing area 33 has previously exceeded its closing pressure.

Just before barrel 26 begins its downward movement, the pressures within casing area 33 and in chambers 42 and 36 are equal and rising again at rate "$r$." This soon exceeds the opening pressure of valve 28 which allows the power transmission fluid trapped in chamber 36 to escape therefrom, into the production tubing 20 via channel 39. Because the pressure within production tubing 20 is less than that in casing area 33 and chamber 42, the fluid within chamber 36 escapes freely, thereby allowing traveling barrel 26 to proceed downwardly. The rate of pressure increase is, of course, less than "$r$" due to the loss of fluid through valve 28 and is designated "$r$-28 in" in FIG. 4.

As barrel 26 is forced downwardly, the pressure within barrel 26 is less than that within production tubing 20, thereby closing check valve 32. Meanwhile downwardly moving valve 31 opens and allows well effluent to flow through the opening 44 in the plate 45 and to refill the traveling barrel 26 prior to the next cycle.

To summarize, during each cycle the power transmission fluid enters chamber 36 below the member 47 and forces the traveling barrel 26 upwardly; the fluid in the chamber 42 on the other side of member 47 is displaced and flows through the valve 30 into the interior of the production tubing 20. Valve 27 closes as the traveling barrel 26 reaches the top of its travel. Then as the pressure continues to increase, valve 30 closes and valve 29 opens, allowing the power transmission fluid to enter chamber 42. This increased pressure forces member 47 and the traveling barrel 26 downwardly as valve 28 opens, and the fluid on the lower side of the member 47 in chamber 36 is displaced and flows through the valve 28 into the channel 39 and the interior of the production tubing 20.

The pressure on the power transmission fluid, required to drive the pump through this action is produced by the hydrostatic power transmission fluid head in area 33 and the variable pressure produced by the pump 10 at the surface of the ground which is controlled by the three valves 13, 14, and 15. The pump 10 is preferably a type that produces a constantly increasing or decreasing flow such as a centrifugal pump rather than a piston type which produces a pulsating flow. The valve 14 is set to open and allow fluid to flow from the pump 10 to the well casing 16 when the pressure in the conduit 17 decreases to a predetermined value and to close to this flow when the pressure in this conduit reaches a substantially higher predetermined value. The controls on the valve 13 are preferably connected to the controls on the valve 14 so that they open and close substantially simultaneously. As explained previously, when the valves 13 and 14 are closed, the fluid from pump 10 is directed through valve 13 directly into conduit line 18; while at the same time the pressure previously built up with casing area 33 is relieved as it flows back through valve 14 and through check valve 15 into conduit line 18, eventually reaching reservoir 12. It can be seen that the flow of the power transmission fluid from the pump 10 is relatively constant although variable in magnitude from a low pressure to a high pressure at a rate "$r$" and variable from a high pressure to a low pressure at a faster rate. The valves 13 and 14, by periodically opening and closing, allow the variable pressure produced by this pump to be varied as it is exerted on the column of power transmission fluid in area 33. The two valves 13 and 14 may be power operated; the power to operate them can be obtained by connecting a line to the gas outlet conduit of the unit 22.

The system described herein will operate most efficiently when the compressibility of the power transmission fluid is low. In order to minimize the horse power requirements for pump 10 it is desirable but not essential to use a power transmission fluid having a greater density than that of the well effluent being handled. For example, if the well effluent is 100% oil, a salt water solution or "dead" oil would work well and would normally be available at the average field.

Figure 5:
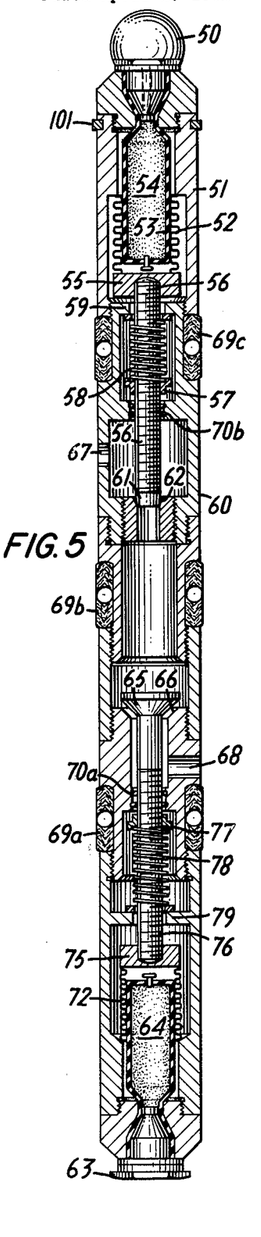
FIGS. 5–6 are detailed cross-sectional elevations of exemplary embodiments of valves that are adapted to be used with the system.
Figure 6:
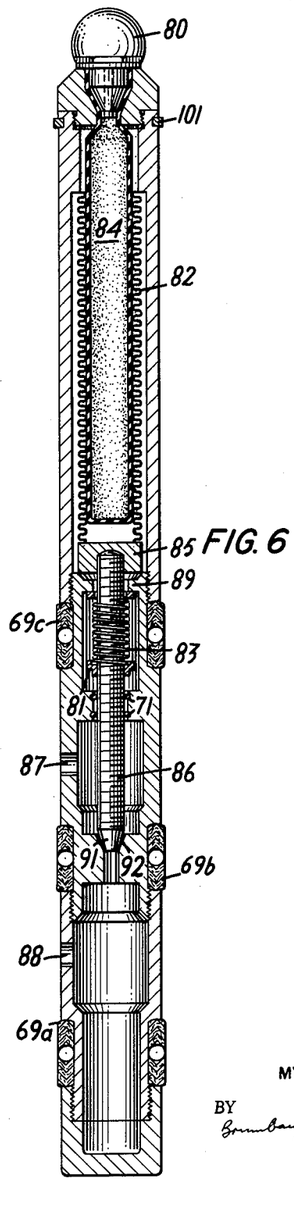

The two check valves 31 and 32 may be of a conventional type. A preferable construction of the valves 27 and 30 (without their check mechanisms) is shown in FIG. 5 and of the valves 28 and 29 (without their check mechanisms) is shown in FIG. 6. If desired, the valves 27–32 may be provided with means whereby they can be retrieved by various means such as wire line methods.

The valve shown in FIG. 5 is a dual bellows type that is designed to open at a first pressure and close at a second higher pressure. It includes a fishing neck 50 at its uppermost end which is connected to a bellows carriage 51. Within this carriage 51 is a bellows 52 and a flexible inner liner 53 which forms a bellows chamber 54. This bellows chamber is initially charged to a predetermined pressure, for example, by removing the fishing neck 50 and charging the chamber through a port formed in the bellows carriage.

A bellows base 55 and a valve stem 56 are attached to the bellows 52. An optional adjusting nut 57 is threaded onto the valve stem 56 and an optional compression spring 58 may be disposed between this adjusting nut and a block 59 that is formed on the carriage 51 of the valve. The force produced by this compression spring, which supplements the force produced by the bellows 52 and absorbs shock loads, can be adjusted by setting the position of the adjusting nut 57. It should also be noted that other embodiments are envisioned which use tension springs and arrangements which result in reducing the force exerted by the bellows to the predetermined value or arrangements which replace the bellows entirely. Also fastened to the valve stem 56 is an upper valve member 61 which is seated in an upper valve seat 62 that forms part of the casing 60 for this valve.

The lower portion of this valve is somewhat similar to the end just described. The lower end of this valve is equipped with a cap 63 which may be removed prior to charging a lower bellows chamber 64. A bellows base 75 and a valve stem 76 are attached to a bellows 72. In a similar manner as described above an optional adjusting nut 77 is threaded onto a valve stem 76 and an optional compression spring 78 may be disposed between this adjusting nut and block 79. A lower valve member 65 is fastened to the valve stem 76 and is adapted to be received in a lower valve seat 66. It should be noted that the normal position for the valve member 65, when the system is below its predetermined closing pressure, is located above the valve seat 66 so that the passage at this point is open.

The upper portion of the valve case 60 has a port 67 formed therein which, when this valve is being used as the valve 27 in the pump, is in communication with the chamber 36 in the pump. The mid-portion of the valve case 60 has a port 68 which is connected to the casing area 33. The port 68 is formed in the same general casing that forms the valve seats 62 and 66.

When this valve is to be used as the valve 27 in the pump 10, the position of the valve members 61 and 65 is adjusted on the valve stems 56 and 76 so that upper valve member 61 is seated tightly in valve seat 62 and, as stated above, valve 65 is initially open when the pressure being exerted by the pump 10 at the surface of the ground is below a predetermined level which is higher than the opening pressure of valve member 61. The flow of power transmission fluid through the port 68 and out of the port 67 is, therefore, cut off at this position of equilibrium.

When the pressure on the power transmission fluid is increased to the point indicated on FIG. 4 as the opening pressure for the valve 27, the upward force of the power transmission fluid acting through the port 68 against the under surface of the valve 61 overcomes the resistive force of bellows 52 and the compression spring 58, and causes the valve member 61 to move off valve seat 62, so that the power transmission fluid is able to flow through the valve and out of the port 67.

As stated above, once valves 27 and 30 open, the pressure exerted by the power transmission fluid continues to increase but at a lesser rate "r–30" as shown in FIG. 4 as the traveling barrel 26 moves upwardly. When the force resulting from this pressure on this valve, when used as valve 27, is equivalent to and exceeds the pressure and resulting force to which the lower bellows chamber 64 is pre-charged, which is the closing pressure for this valve, the pressure of power transmission fluid on the upper surface of valve member 65 overcomes the fluid pressure on the lower surface of said valve, the force of the bellows 72, and the force of the compression spring 78. This downward resultant force causes the valve member 65 and the valve stem 76 to descend. This downward movement continues until valve member 65 rests tightly against valve seat 66 thereby discontinuing the flow of power transmission fluid through this valve.

When the pressure applied by surface pump 10 is decreased to the point where the force applied is less than the internal force in the lower bellows chamber 64, and its supplemental forces, the valve member 65 once again opens as valve stem 76 and moves upwardly and away from valve seat 66. As the pressure applied by the surface pump continues to rapidly decrease, the upper bellows 52 expands and returns the valve member 61 to its normally closed position.

Packing elements 69a, 69b and 69c are provided on the sides of the valve casing so that the valve can be properly received in a mandrel provided in the pump 19. These packing elements also serve to isolate the various ports in the valve from each other. Internal packing elements 70a and 70b, in turn, isolate the upper and lower bellows from the fluid flow chambers.

When the valve in FIG. 5 is used as valve 30 in pump 19, it functions in a manner identical to that described for the valve 27 except that the passageway 68 is in communication with the power transmission fluid in the chamber 42 instead of the casing area 33 as it was in valve 27. The port 67 is in communication with the channel 41 in valve 30 instead of the chamber 36 as it was when used in valve 27.

The valve shown in FIG. 6 is a single bellows type. Although structurally unique this valve encompasses virtually the same principles as those disclosed by the upper portion of the valve shown in FIG. 5. It includes a removable fishing neck 80 at its uppermost end through which bellows chamber 84 is initially charged to a predetermined pressure. A bellows base 85 and a valve stem 86 are likewise attached to the bellows 82. Also an optional compression spring 83 may be disposed between optional adjusting nut 81 and a block 89 that is formed on the carriage of the valve. The force of this compression spring supplements the force produced by the bellows 82 and may optionally replace it. When the pressure of the power transmission fluid acting through inlet port 88 reaches sufficient magnitude, valve 91, located at the lowermost point of valve stem 86, is forced from valve seat 92, thereby allowing fluid to flow through the valve and out through outlet port 87.

When this valve is used as the valve 29, port 88 is connected to the casing area 33 and the outlet port 87 is connected to the chamber 42. When it is used as the valve 28 the inlet port is communicated with the chamber 36 and the outlet port 87 is connected to channel 39.

Again packing elements 69a, 69b and 69c are provided on the sides of the valve casing thereby serving to isolate the various valve ports from each other. Internal packing elements 71 isolate the bellows 82 from the fluid flow chambers.

Figure 7:
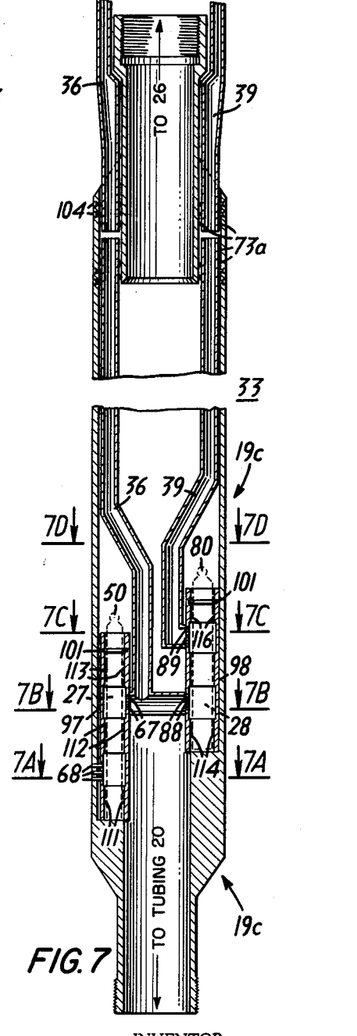
FIG. 7 is generally a side elevation in longitudinal cross-section of a more detailed configuration of the lower portion of a pump in the system showing the relative positions of the valves and the pump conduits, in which some of the construction details have been altered in order to clarify the illustration.
Figures 7A, 7B, 7C, 7D, 8:
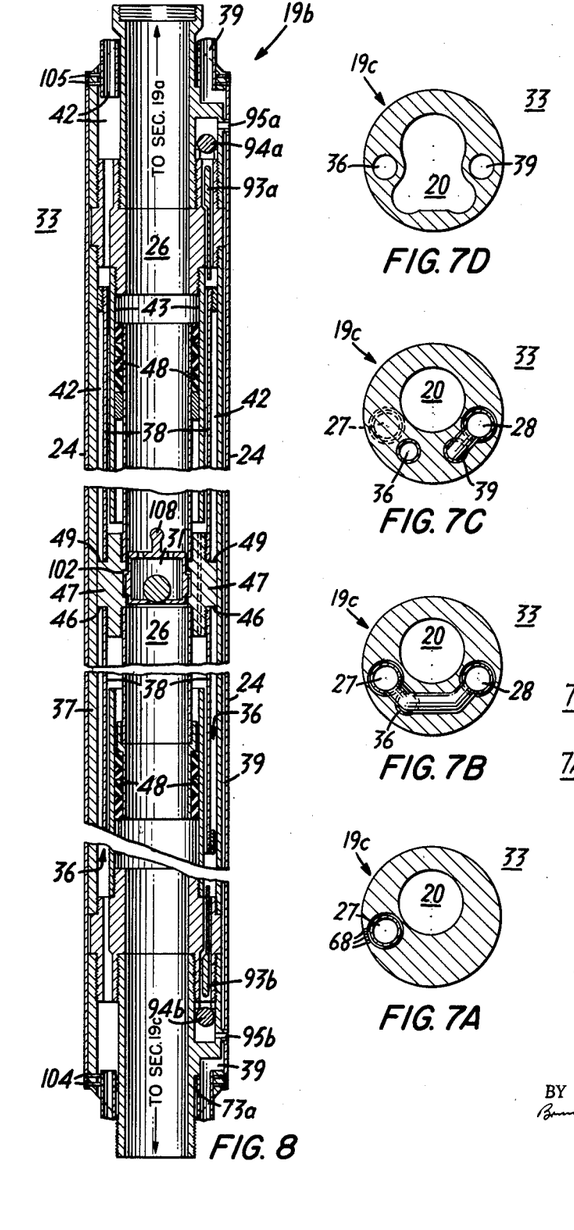
FIGS. 7A, 7B, 7C and 7D present detailed cross-sectional views taken along the lines 7A, 7B, 7C and 7D in FIG. 7 looking in the direction of the arrows.
FIG. 8 is a side elevation in longitudinal cross-section of a more detailed configuration of the central portion of a pump in the system with its traveling barrel approaching the upper position.
Figure 9:
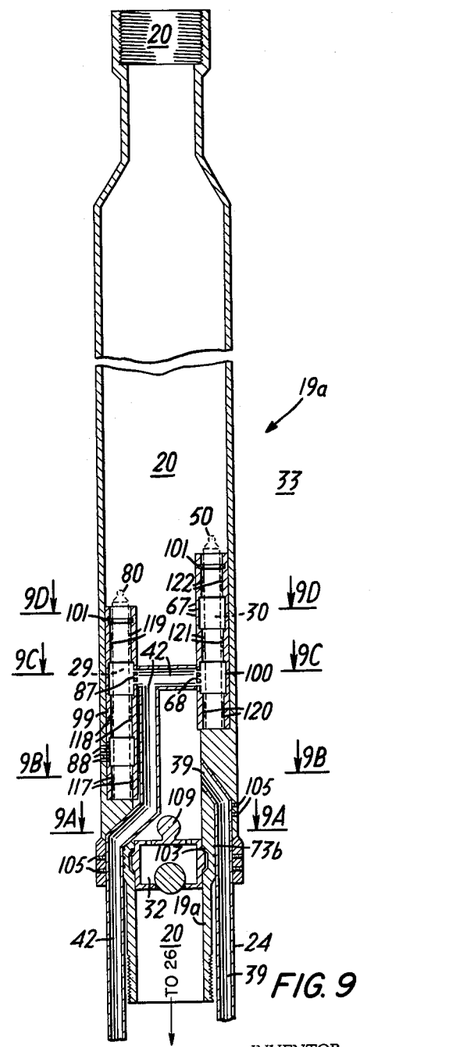
FIG. 9 is generally a side elevation in longitudinal cross-section of a more detailed configuration of the upper portion of a pump in the system showing the relative positions of the valves and the pump conduits, in which some of the construction details have been altered in order to clarify the illustration.
Figure 9A:
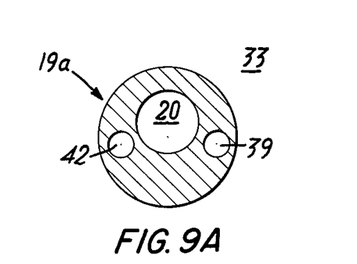
FIGS. 9A, 9B, 9C and 9D present detailed cross-sectional views taken along the lines 9A, 9B, 9C and 9D in FIG. 9 looking in the direction of the arrows.
Figure 9B:
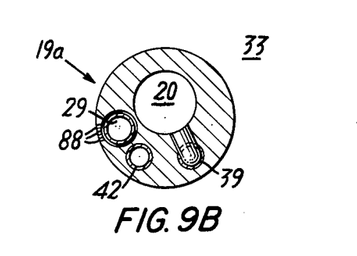
Figure 9C:
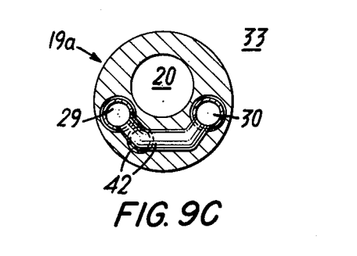
Figure 9D:
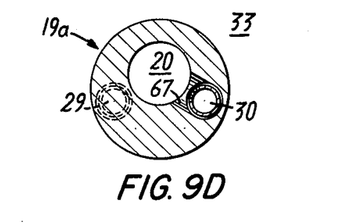

FIGS. 7 through 9 disclose a more detailed and specifically operational design in which the positions of the valve mandrels and the pump's tubing are shown.

The outline of valve 27 is shown positioned and locked in its receiver 97 by locking device 101. Mandrel 97 is an integral part of pump section 19c which is the lower portion of pump 19. Entrance port 68 of valve 27 is effectively sealed in communication with casing area 33 by virtue of packing elements 69a and 69b as shown in FIG. 5, being sealed in packing areas 111 and 112 as shown in FIG. 7. Outlet port 67 is similarly sealed in mandrel 97 in communication with chamber or channel 36 by virtue of packing seals 69b and 69c being seated in areas 112 and 113 respectively.

Valve 28 is positioned and locked in its receiver 98 by its locking device 101. Inlet port 88 of valve 28 is sealed in communication with chamber 36 by its packing elements 69a and 69b (FIG. 6) sealing in areas 114 and 115 respectively. Outlet port 87 is sealed in communication with channel 39 by packing elements 69b and 69c being sealed against areas 115 and 116 (FIG. 7), respectively.

So positioned, valves 27 and 28 function in the manner previously described. FIGS. 7A through 7D illustrate various cross-sectional areas of the general construction arrangements of section 19c.

Section 19c is connected to section 19b (FIG. 8) of pump 19 by a threaded connection. The conduit channels 36 and 39 just described are connected to a continuation of these channels in FIG. 8. Appropriate seals 73a (FIGS. 7 and 8) maintain communication between conduit sections of channels 36 and 39. Allen head screws or comparable 104 (FIGS. 7 and 8) hold the conduit channels 36 and 39 in permanent position.

FIG. 8 shows the central section of pump 19 including traveling barrel 26. This detailed configuration is basically the same as the first, although certain structural changes make it more streamlined and compact. It is noted that in FIG. 8 members 37 and 24, as shown in FIGS. 2 and 3, are in intimate contact. It is further noted that sealing elements 48 previously shown on either side of member 43 (FIGS. 2 and 3) may be designed as single sealing elements 48 on the internal side of member 43 (FIG. 8). It is recognized, however, that in other embodiments not shown the internal member 38 of barrel 26 may be omitted and seals 48 may be located on the external member 38 of barrel 26 to effect a seal on the external side of cylindrical member 43.

In FIG. 8, check valve 31, located in the bottom plate of traveling barrel 26, is shown nearing the top or the half-way point in its displacement cycle. This valve is locked in position to the bottom plate of traveling barrel 26 by locking device 102.

Hydraulic brakes 93a–94a and 93b–94b, illustrated in FIG. 8, are mechanisms to control the upper and lower stroke limits of the traveling barrel 26. The hydraulic brake is composed of an accurately machined member 93 that is essentially a free floating member within its confined area and a ball-seat check valve 94. This check valve may be either a magnetic or gravity type.

As traveling barrel 26 approaches its upper limit during its displacement cycle, the upper end of exterior member 38 contacts free floating member 93a. The continued upward movement of member 38 forces member 93a upward until it contacts the ball 94a and forces it off the seat. When this occurs, area 42 is then in communication with casing area 33. With the pressure in chamber 42 equal to the pressure in chamber 36, no resulting force is imparted to traveling barrel 26 and the friction of the system soon halts the remaining upward inertia. A similar braking effect occurs on the downstroke of traveling barrel 26 as the lower end of member 38 contacts the free floating member 93b.

All other operational functions of the various members within section 19b (FIG. 8) are the same as has been previously described for the general configuration shown in FIGS. 2 and 3.

The upper extremity of section 19b of pump 19 becomes an integral portion of section 19a by threaded connections. The channels 42 and 39 of member 19b are connected to the same channels in section 19a. Allen head type locking screws 105 lock the conduit connections of channels 42 and 39 together. Sealed communications of these channels are effected by seals 73b (FIG. 9).

In FIG. 9 dotted lines indicate the operating position of valve 29 in its receiving chamber 99. Entrance port 88 is isolated in communication with casing area 33 as a result of packing seals 69a and 69b (FIG. 6) being seated in packing areas 117 and 118 (FIG. 9), respectively. The exit port 87 of valve 29 is sealed and in communication channel 42 as a result of seals 69b and 69c (FIG. 6) being seated in areas 118 and 119 (FIG. 9). Valve 29 is locked into position by its latching device 101.

The outline of valve 30 (FIG. 5) is indicated in its operating position in its receiving chamber 100 in FIG. 9. The entrance 68 is isolated in communication with channel 42 as a result of seals 69a and 69b (FIG. 5) being seated in areas 120 and 121 (FIG. 9) respectively. Exit port 67 (FIG. 5) is isolated in communication with channel 41 and production tubing 20 as a result of seals 69b and 69c being seated in areas 121 and 122 in FIG. 9. Valve 30 is locked in this position by its latching device 101.

So positioned valves 29 and 30 function in the manner described in the first general configuration.

In FIG. 9 the check valve 32 is located in the stationary upper plate forming the top of barrel 26 and is locked in position by locking device 103.

The FIGS. 9A through 9D illustrate the general construction of section 19a more clearly.

The fishing necks 50 (valves 27 and 30), 80 (valves 28 and 29), 108 (check valve 31) and 109 (check valve 32) are to accommodate the placing and retrieving of these valves by portable wire line equipment when the tubing is not to be removed from the hole. The various latching and locking devices 101-103 are so designed that an upward or downward force applied to the fishing necks by the running and retrieving tools results in unlocking or locking the various valves with respect to their mandrels. It is recognized and considered as a portion of this invention that the valves 27-32 may fit the position permanently within the body of the overall pump 19 and that the complete pump may be retrieved by either wire, line, pipe, sucker rod or hydraulic techniques.

While representative embodiments of the present invention have been shown and described for the purposes of illustration, it is apparent that the embodiments are susceptible of change and modification without departing from this invention in its broader aspects. For example, while the specifically disclosed exemplary embodiments illustrate the lifting of fluids from a subterranean location, the disclosed system of the invention is obviously applicable to the movement of fluids both vertically and horizontally in a wide variety of fluid transmission conduits on, above or below the surface of the earth or through land or water formations thereof.

The fluid supply and pressure relief functions of the valve manifold including the valves 13, 14 and 15 may be provided by a wide variety of other suitable valve manifold arrangements. Further, the valve structure shown in FIGS. 5 and 6 will have many other applications in fluid systems. Therefore, the invention described herein is not to be construed as limited to the specific embodiments described but is intended to encompass all modifications thereof coming within the scope of the following claims.

I claim:

1. A system for obtaining fluids from distant locations comprising a fluid pumping mechanism adapted to be disposed at a first distant location, a source of power transmission fluid adapted to be disposed at a second accessible location, conduit means connecting said source to said pumping mechanism, means for periodically applying variable pressure on the power transmission fluid contained in said conduit means, a movable member contained in said pumping mechanism for displacing fluid, first pressure responsive valve means coupled to said pumping mechanism which is adapted to enable the power transmission fluid to exert a force in a first direction on said movable member when said pressure is at a first magnitude, and second pressure responsive valve means coupled to said pumping mechanism which is adapted to enable the power transmission fluid to exert a force in a second direction on said movable member when said pressure is at a second higher magnitude.

2. A system for obtaining fluids from distant locations of the type described in claim 1 wherein said means for periodically applying pressure on the power transmission fluid contained in said conduit means includes a fluid pump coupled to deliver fluid under pressure to said conduit means, and valve means coupled to said conduit means between said fluid pump and said pumping mechanism which is adapted to open and close to the flow of the power transmission fluid in said conduit.

3. A system for obtaining fluids from distant locations of the type described in claim 1 wherein said means for periodically applying pressure on the power transmission fluid contained in said conduit means includes a fluid pump coupled to deliver fluid under pressure to said conduit means, third pressure responsive valve means coupled to said conduit which is adapted to periodically permit the flow of said power transmission fluid through said conduit, a return conduit coupled to said third valve means in such a manner as to receive said power transmission fluid when said third valve means does not permit fluid flow through said conduit means, and a reservoir coupled to receive fluid from said return line and supply it to said fluid pump.

4. A system for obtaining fluids from distant locations of the type described in claim 1 wherein said movable member includes a hollow elongated member having means at a first end through which fluids can enter and means at its opposite end through which fluids can leave, and guide means for guiding the movement of said movable member.

5. A pumping mechanism for obtaining fluids from distant locations comprising a movable member adapted to be disposed at a distant location, guide means attached to said movable member for guiding its movement, first valve means coupled to said movable member which enables fluid to enter said member, second valve means which enables fluid to leave said pumping mechanism, third valve means for enabling power transmission fluid to pass therethrough and exert a force in one direction on said movable member when the pressure of the fluid is at a first magnitude, and fourth valve means for enabling power transmission fluid to flow therethrough and exert a force in an opposite direction on said movable member when the pressure of the fluid is at a second higher magnitude.

6. A pumping mechanism of the type described in claim 5 and further including fifth valve means to enable a quantity of the power transmission fluid to flow therethrough as it is displaced when said movable member is forced in said one direction, and sixth valve means to enable a quantity of said power transmission fluid to flow therethrough as it is displaced when said movable member is forced in said opposite direction.

7. A pumping mechanism for obtaining fluids from distant locations comprising a member that is movable between a first position and a second position, guide means for guiding the movement of said member between said first and second positions, a first pressure responsive valve for passing a power transmission fluid therethrough when the pressure on the fluid is at a first magnitude, a second pressure responsive valve for passing a power transmission fluid therethrough when the pressure on the fluid is at a second higher magnitude, the member being constructed such that the power transmission fluid passing through the first valve forces the member to move from the first position to the second position and the power transmission fluid passing through the second valve forces the member to move from the second position to the first position, a third pressure responsive valve to enable a quantity of the power transmission fluid to flow therethrough when it is displaced by said movable member moving toward said second position, a fourth pressure responsive valve to enable a quantity of the power transmission fluid to flow therethrough when it is displaced by said movable member moving toward said first position, first check valve means mounted on said movable member which allows a fluid to flow therethrough and fill said movable member as said member moves toward said first position, and second check valve means which allows the fluid to pass therethrough out of said movable member as said member moves toward said second position.

8. A pumping mechanism of the type described in claim 7 wherein the first, second, third and fourth pressure responsive valves each operate in combination with a one-way check valve.

9. A pumping mechanism of the type described in claim 7 wherein said first and third pressure responsive valves each comprise an elongated hollow casing, a plurality of valve stems mounted lengthwise of the casing, a bellows fastened to one end of each valve stem, each of said bellows being adapted to be initially charged to a predetermined pressure, valve members mounted on each valve stem and mating valve seats mounted on said casing, a fluid channel between two ports formed through said pressure valve along a path that includes said valve members and said valve seats, one of said valve members being positioned in its said mating valve seat such that it allows fluid to flow through said channel when the fluid pressure at one of said ports is greater than a predetermined value, and another of said valve members being positioned above its said mating valve seat such that it allows fluid to flow through said channel until the fluid pressure at one of said ports exceeds a second higher predetermined value.

10. A pumping mechanism with pressure responsive valves as described in claim 9 wherein a spring is mounted on at least one of said valve stems for changing the pressure exerted by said bellows.

11. A pumping mechanism with pressure responsive valves as described in claim 9 wherein seals separate the said bellows from the said fluid channel.

12. A pumping mechanism with pressure responsive valves as described in claim 10 wherein seals separate the said bellows and said spring from the said fluid channel.

13. A pumping mechanism of the type described in claim 7 wherein said second and fourth responsive valve means each comprise a hollow casing, a valve stem mounted lengthwise of the casing, a bellows fastened to one end of said valve stem, said bellows being adapted to be initially charged to a predetermined pressure, a valve member mounted on said valve stem and a mating valve seat mounted on said casing, a fluid channel between two ports formed through said pressure valve along a path that includes said valve member and said valve seat, said valve member being positioned in said valve seat such that it allows fluid to flow through said channel when the fluid pressure at one of said ports is greater than a predetermined value.

14. A pumping mechanism with pressure responsive valves as described in claim 13 wherein a spring is mounted on said valve stem for changing the pressure exerted by said bellows.

15. A pumping mechanism with pressure responsive valves as described in claim 13 wherein seals separate the said bellows from the said fluid channel.

16. A pumping mechanism with pressure responsive valves as described in claim 14 wherein seals separate the said bellows and said spring from the said fluid channel.

17. A pumping mechanism of the type described in claim 7 wherein said pressure responsive valves include means for securing said valves in receiving mandrels and for facilitating retrieval therefrom.

18. A pumping mechanism of the type described in claim 7 wherein said inlet and outlet fluid check valves include means for securing said valves and for facilitating retrieval.

19. A pumping mechanism of the type described in claim 7 wherein braking means equalize the pressure on each side of the said movable member when it nears upper or lower limits, thereby stopping said movable member.

20. A pumping mechanism responsive to periodic increases and decreases in a power transmission fluid for obtaining fluids from distant locations comprising a pumping member that is movable between a first position and a second position for displacing the fluid to be pumped, guide means for guiding the movement of said member between said first and second positions, said pumping member having first and second opposing pressure responsive control surfaces adapted to be selectively in communication with the power transmission fluid for urging said member toward a respective one of said first and second positions, a first pressure responsive valve for passing power transmission fluid therethrough when the pressure of said power transmission fluid is at a first magnitude to place said first opposing surface in free communication with said power transmission fluid to urge said member from said first position toward said second position, a second pressure responsive valve for passing power transmission fluid therethrough when the pressure of said power transmission fluid is at a second higher magnitude to place said second opposing surface in free communication with said power transmission fluid to urge said member from said second position toward said first position, a third pressure responsive valve for enabling said power transmission fluid in communication with said second opposing surface to be relieved when said power transmission fluid is displaced by said movable member moving from said first position toward said second position, a fourth pressure responsive valve for enabling said power transmission fluid in communication with said first opposing surface to be relieved when said power transmission fluid is displaced by said movable member moving from said second position toward said first position.

21. A pumping mechanism as described in claim 20 wherein braking means are provided for stopping said movable member on reaching said first and second positions, said braking means comprising valve means for selectively placing each of said opposed surfaces in free communication with said power transmission fluid, and actuating means responsive to the position of said movable member as it approaches said first and second positions for operating said respective valve means to equalize the pressure of power transmission fluid on said opposing surfaces.

References Cited in the file of this patent

UNITED STATES PATENTS

| | | |
|---|---|---|
| 2,624,285 | Hall | Jan. 6, 1953 |
| 2,628,565 | Richardson | Feb. 17, 1953 |
| 2,780,171 | Heddy | Feb. 5, 1957 |
| 2,870,749 | Deitrickson | Jan. 27, 1959 |
| 2,884,952 | Mason et al. | May 5, 1959 |
| 2,890,715 | Ebersold | June 16, 1959 |
| 2,984,224 | Brennan et al. | May 16, 1961 |